Figure 1:
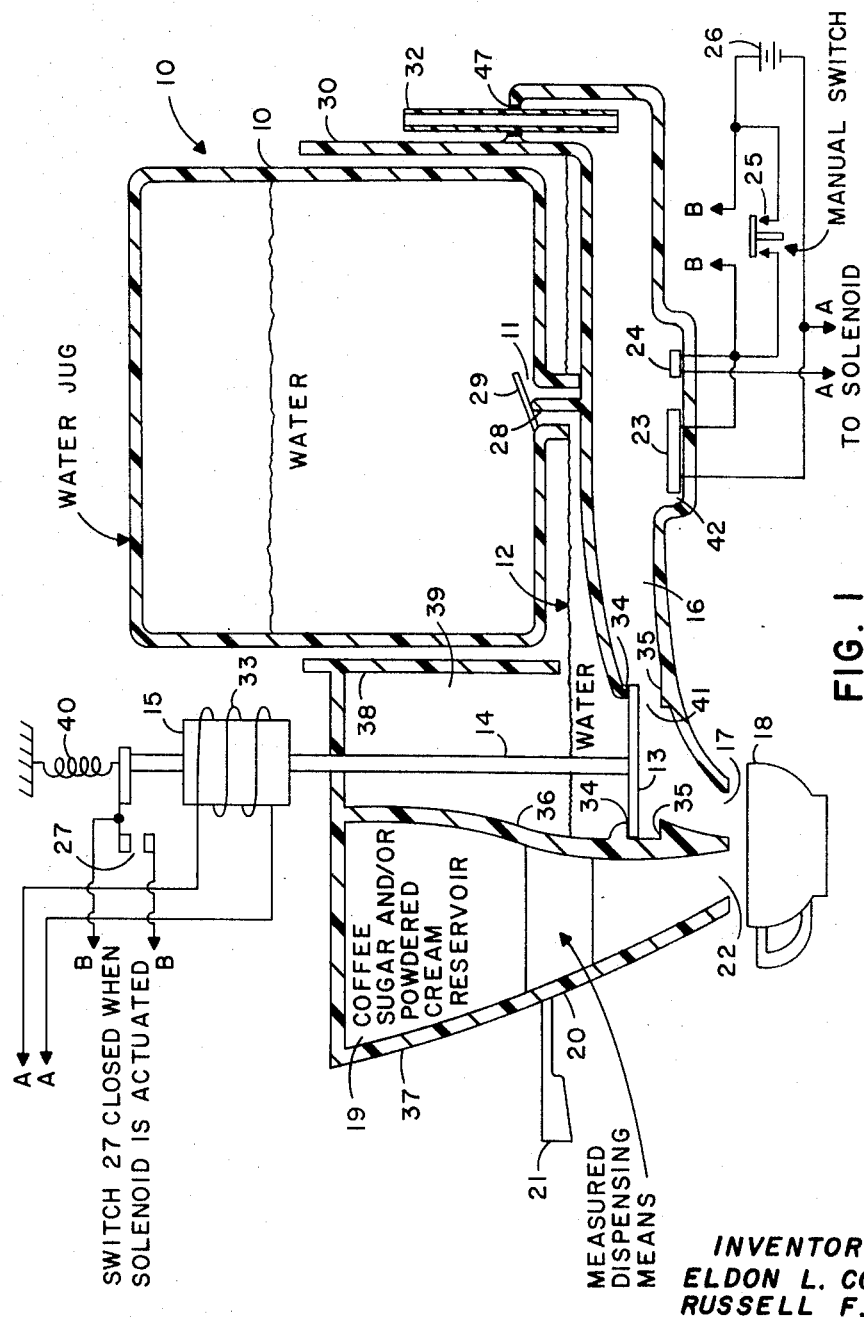

United States Patent

[11] 3,589,559

[72] Inventors Eldon L. Colton
366 Brentwood Drive N.E., Cedar Rapids, Iowa 52402;
Russell F. Colton, 857 16th St. S.E., Cedar Rapids, Iowa 52403
[21] Appl. No. 781,006
[22] Filed Dec. 4, 1968
[45] Patented June 29, 1971

[54] HOT DRINK DISPENSER
18 Claims, 5 Drawing Figs.
[52] U.S. Cl. .................................................. 222/23, 222/54, 222/146, 222/453
[51] Int. Cl. ........................................................ B67d 5/38
[50] Field of Search .......................................... 222/23, 54, 504, 146 H, 442, 437, 453, 325

[56] References Cited
UNITED STATES PATENTS
| | | | |
|---|---|---|---|
| 2,042,928 | 6/1936 | Da Costa.................... | 222/437 X |
| 2,863,590 | 12/1958 | Giesse........................ | 222/146 X |
| 2,993,624 | 7/1961 | Christ et al................ | 222/54 |
| 3,349,964 | 10/1967 | Ladoniczki et al........ | 222/54 |

Primary Examiner—Robert B. Reeves
Assistant Examiner—H. S. Lane
Attorney—Donald W. Phillien, Sr.

ABSTRACT: A hot beverage dispensing means having first, second, and third reservoirs; one below the other in the order listed. The first reservoir is watertight except for one outlet at the bottom thereof which fills the second reservoir up to the level of said opening. A two-position valve in its lower position allows water to flow from the second to third reservoir where it is heated by a heater activated when said valve is in its lower position. Movement of the valve to its upper position in response to a thermostatic indication deactivates the heater and release the heated water into a cup.

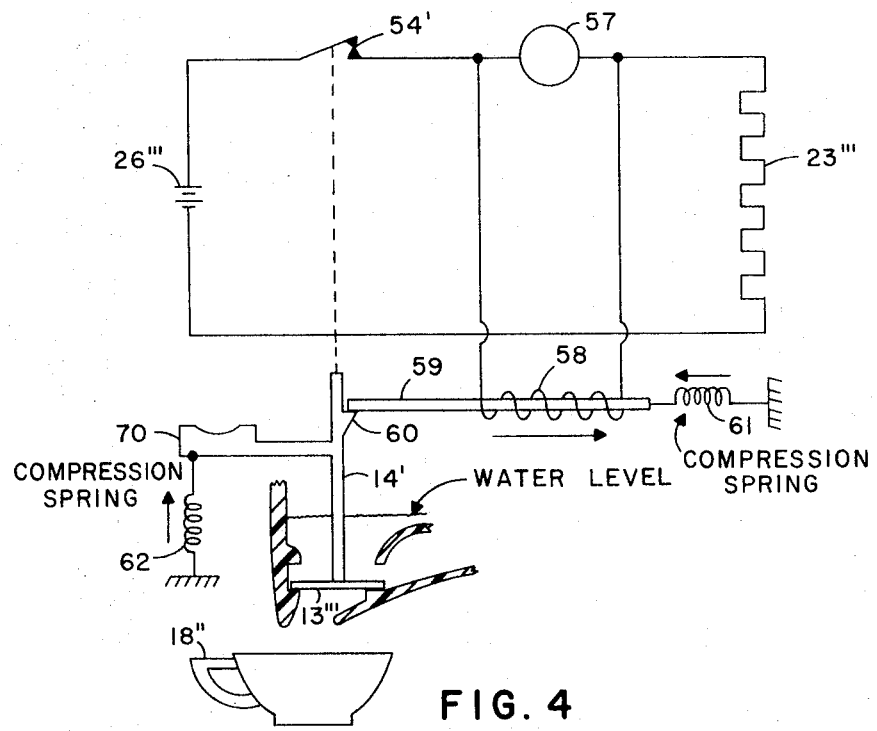
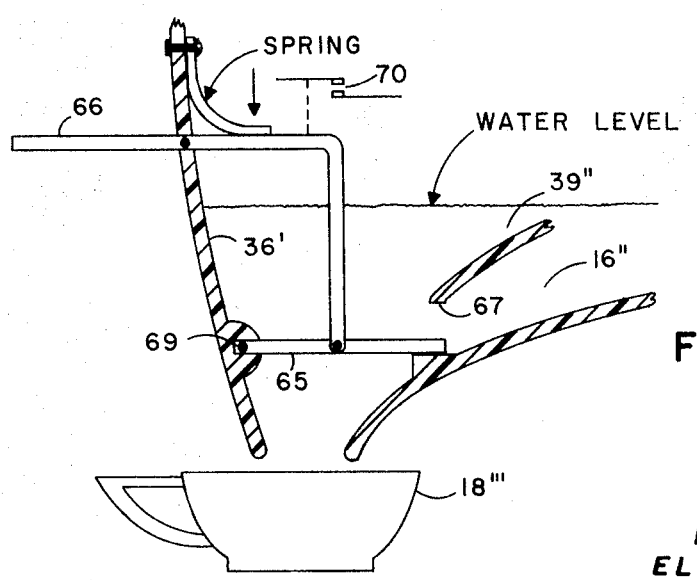

HOT DRINK DISPENSER

This invention relates generally to a beverage dispensing means and more particularly to a device for automatically dispensing a measured amount, such as a cupful, of heated liquid in response to the operation of a single control means, such as a lever or pushbutton.

There are in the prior art several devices which are constructed to heat a predetermined amount of water to some desired temperature and then to release said heated water into some external receptacle such as a cup. Some suitable additive such as instant coffee or tea can be added to the water to make a cup of hot beverage. Most of these prior art devices are relatively complicated and expensive, usually involving a plurality of internal valves, thermally activated switches and other moving parts.

One object of the present invention is a simple and inexpensive hot beverage dispenser, whose complete cycle is initiated by the operation of one control means.

A second object of the invention is a simple, reliable, and inexpensive hot beverage dispenser.

A third purpose of the invention is a reliable hot beverage dispensing means whose only moving part is a single valve.

A fourth object of the invention is a hot beverage dispenser constructed to deliver a measured amount of hot beverage in response to the energization of a single control means.

A fifth object of the invention is a hot beverage dispenser constructed to heat and dispense, during a single operation, a variable amount of hot water, such as for example, from one to three cupsful.

A sixth aim of the invention is the improvement of hot beverage dispensers generally.

In accordance with the invention there is provided a first liquid-containing reservoir positioned within a second reservoir. Said first reservoir is airtight except for an opening in the bottom thereof to permit the liquid therein to flow into said second reservoir until the liquid in said second reservoir rises to a level just sufficient to seal off the opening in the first reservoir. A third reservoir is provided which has an opening connectable to either said second reservoir or to an external receptacle, such as a cup, under control of a valve. Heating and control means are activated by a single manually operated control to execute the steps of permitting water to flow from said second to third reservoir, energizing a heating element in said third reservoir to heat the water therein, detecting and responding to a predetermined temperature of said heated water to deenergize the heating element and to activate said valve to close the opening between said second and third reservoirs and to create an opening from said third reservoir to the external receptacle.

In accordance with a modification of the invention a circuit comprising a thermal switch in parallel with a ready light is placed in series with the manually operated initiate-operation switch. Such circuit is connected in series with a heating coil. Upon attainment of the desired temperature of the water being heated, the thermal switch is activated to cause a voltage to be applied across the ready light, which flashes an indication to the operator who at his leisure can release the valve and empty the heated water into a receptacle such as a cup.

In accordance with another form of the invention the valve is manually depressed by the operator to interconnect the second and third reservoirs and is maintained in such depressed position by a thermally responsive detent means. When the water attains the desired temperature the thermal detent means functions to release the depressed valve which in turn closes the opening between the second and third reservoirs, releases the heated water into a cup, and opens the heater circuit.

In accordance with a feature of the invention a pipe or tube open at both ends extends vertically from within the third reservoir, through an airtight seal in the wall of the third reservoir, and to the outside of said third reservoir. By raising or lowering the tube the water capacity of the third reservoir can be altered as desired, since a varying amount of air will be trapped in said third reservoir.

Figure 2:
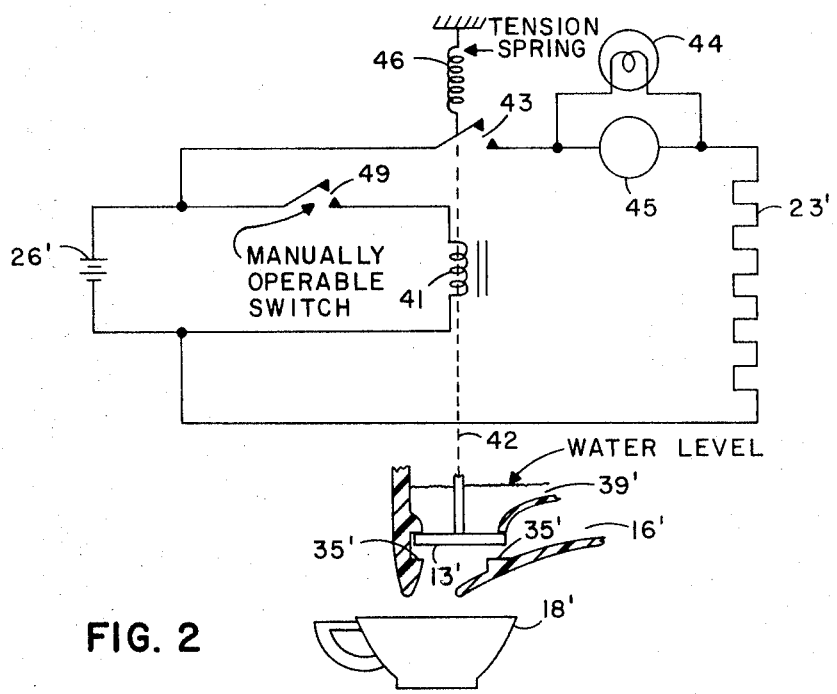
Figure 3:
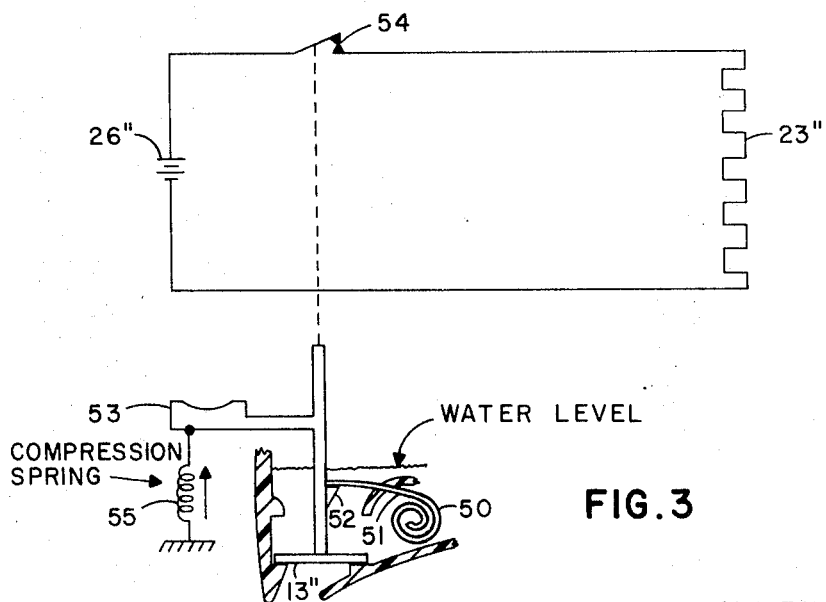

The above mentioned and other objects and features of the invention will be more fully understood when read in conjunction with the drawings in which:

FIG. 1 is a diagrammatic view of the invention;
FIG. 2 shows an alternative form of control circuit;
FIG. 3 shows another alternate form of the control circuit;
FIG. 4 is still another form of the control circuit; and
FIG. 5 shows a second type valve which can be employed.

Referring now to FIG. 1 a reservoir of water 10, which can be a jug, is positioned in an inverted manner in a second reservoir 39 having walls 38, 30, and 36 for supporting the jug and for holding water which flows out of the jug. More specifically the water in the jug flows out the opening 11 into the reservoir 39 and attains a level 12 which is the level of opening 11, in accordance with well known hydrostatic principles.

Although not essential to the invention, the opening 11 of the jug is fitted with a flap 29 which is ordinarily closed. However, when the jug is inverted and placed in the position shown, the finger 28 opens the flap and lets the water out.

When it is desired to heat a cup of water, the solenoid 15 is activated by energizing winding 33 in a manner to be described later. In response to energization of solenoid 15 the shaft 14 is moved downward to cause the cylinder valve 13 to become unseated from flange 34 and to become seated upon flange 35. The water in reservoir 39 will then flow from reservoir 39 into third reservoir 16 and fill said reservoir 16 up to the bottom of tube 32. The tube 32 is open at both ends and passes through the wall of reservoir 16 by means of airtight seal 47. As the tube 32 is raised or lowered the amount of air trapped in reservoir 16 will vary, thus varying the amount of water which will accumulate in the reservoir. Specifically the capacity of reservoir 16 can be altered considerably, as for example, between one and three cupsfull. Due to control circuit means to be described later, a heating element 23 located in reservoir 16 is energized as the water enters reservoir 16.

It should be noted at this point that as the water flows from reservoir 39 to reservoir 16, additional water escapes from the jug 10 to maintain the water level 12 in reservoir 39 at the level shown in FIG. 1.

Heating element 23 heats the water in reservoir 16 until the water reaches a desired temperature which is detected by thermostat 24. Upon reaching such desired temperature, the control circuit, which will be described later, is deenergized causing deenergization of solenoid 15 and deenergization of the heating element 23. The shaft 14 is pulled into its upward position to seat on flange 34 by suitable means such as spring 40, thus opening aperture 41 and permitting the heated water in reservoir 16 to flow down through opening 17 and into cup 18. It is to be noted that the capacity of reservoir 16 can be just sufficient to fill one cup.

Coffee, sugar and powdered cream can be stored in three separate reservoirs indicated collectively as reservoir 19. Each of these three reservoirs can have a measured dispensing means such as dispensing means 20 and activated by an external lever 21. The measured amount of coffee, sugar or powdered cream flows into cup 18 through outlet 22 by gravity means.

The control circuit can consist of two switches 25 and 27, a thermostat 24, a power source 26, and the solenoid 15 having windings 33 wound thereon. Operation of the device is manually initiated by depressing switch 25 which connects power source 26 across heater element 23 and also across the series combination of thermostat 24 and solenoid winding 33. At low temperatures, the thermostat is conductive so that heating element 23 will be energized. Solenoid 15 is also activated to cause valve 13 to assume its lower position and seat upon flange 35.

The contacts 27 are also closed when solenoid 15 is activated, thus providing circuit means for maintaining energization of the heater element 23 and the relay winding 33 even after pushbutton switch 25 is released.

When the water is sufficiently heated, thermostat 24 becomes open-circuited, deenergizing relay winding 33 and opening contact 27, thus disconnecting power supply 26 from heater element 23 and from solenoid winding 33. Deenergization of solenoid 15 causes valve 13 to assume its upper position, thereby opening aperture 41 and releasing hot water from reservoir 16 into cup 18. It is to be noted that heating element 23 is positioned in a depression 42 which always retains some water, thereby preventing overheating of the heating element.

In order to prevent the system from locking up in its operating mode when there is no water in the system, thermostat 24 can be positioned in the depression 42 along with heater element 23. Thus the residual water left in depression 42 will heat up even though the jug 10 is empty and will open thermostat 24, thus deenergizing the entire device in the manner described above.

If the device should be energized when depression 42 is dry, no means is shown for deactivating the system. To deactivate the system under such conditions it is necessary to provide a means which will respond to the dry condition of depression 42 to either prevent activation of the system or to open thermostat 24 after a short time interval. One such means is to connect the thermostat to the heating element by a metal rod. In the presence of water, insufficient heat will pass through the metal rod to activate thermostat 24. In the absence of water, the heat dissipation along the rod will be small and enough heat will reach thermostat 24 after a given time interval to activate said thermostat.

Referring to FIG. 2 there is shown a form of the invention wherein the initiate-operation switch 49 must be manually closed to initiate operation of the device and must be manually opened to end the operation of the device. More specifically, when the operator closes switch 49 the solenoid 41 is activated to move valve 13 downward to seat on flange 35', thus permitting water flow into reservoir 16' from reservoir 39'. Further, energization of solenoid 41 closes contacts 43 to complete the circuit from power supply 26' through thermostatic switch 45 and heater element 23'. When the water is sufficiently heated thermostatic switch 45 opens and energizing current will flow through ready light 44. The operator, upon seeing the energized light 44, opens switch 49 to deenergize solenoid 41, which in turn opens contacts 43 to completely disable the circuit. The valve 13' returns to its upper position by the action of tension spring 46 and the heated water flows into cup 18'.

Referring now to FIG. 3 there is shown another means for controlling the device employing a bimetallic thermostatic element 50 having a pawl 51, which locks upon detent 52 when valve 13" is depressed to its lower position, as shown in FIG. 3. Depression of valves 13" is effected by the operator pushing down on lever 53 until the pawl 51 slips past detent 52 into the locked position shown in FIG. 3. Contacts 54 are closed by depression of lever 53 to energize heater element 23".

When the water becomes sufficiently heated the thermostatic switch 50 will contract so that pawl 51 will disengage from detent 52. Compression spring 55 will then force lever 53 and valve 13" to their upper positions, thereby opening contacts 54 and deenergizing the heater 23".

Referring now to FIG. 4 there is shown a fourth modification of the invention in which operation is initiated by manual depression of a lever 70 which is rigidly connected to shaft 14' to cause valve 13''' to seat in its lower position and also to close contacts 54'. Power supply 26''' is thereby connected across heater element 23''' through thermostatic control 57. Valve 13''' is maintained in its lower position by magnetic pawl 59 which locks on detent 60 by means of compression spring 61.

During heating of the water there is insufficient current through winding 58 to withdraw the magnetic pawl 59 from detent 60 since thermostatic switch 57 is virtually a short circuit across winding 58. However, when the water is heated to the desired temperature, thermostatic switch 57 opens and a current will flow through winding 58 to cause a withdrawal of the magnetic pawl 59 from detent 60, thereby releasing the valve assembly to its upper position by means of compression spring 62 and opening contacts 54' to completely disable the circuit. The heated water will now flow into the cup 18".

In FIG. 5 there is shown another type valve which can be employed in the circuit. More specifically FIG. 5 shows a butterfly valve 65 which operates around pivot point 69 in the wall 36' of the device. The said valve 65, in its lower position, closes the contacts 70 which correspond to contacts 54' of FIG. 4 and thereby supplies power to the heating element (not shown).

In its upper position butterfly valve 65 closes the opening between reservoirs 39 " and 16" and opens the opening from reservoir 16" to the external receptacle 18, thereby releasing the heated water into said receptacle. Further when said valve 65 is in its upper position contacts 78 are opened to deenergize the entire device.

A further form of the invention not shown in a drawing involves no controls. The valve is both lowered and raised manually. A thermostat and ready light connected as shown in FIG. 2 can be employed to indicate when the water is sufficiently heated.

We claim:
1. Hot beverage dispensing means comprising;
first airtight and watertight reservoir means having a single outlet therein and containing a liquid;
second reservoir means positioned below said first reservoir means; said first reservoir means having its single outlet at the bottom thereof and within said second reservoir means whereby said liquid can gravity flow from said first reservoir means to a level determined by the position of said single outlet;
third reservoir means positioned below said second reservoir means and having second outlet means external to said dispensing means;
valve means positionable in a first position to provide a liquid flow path from said second reservoir means to said third reservoir means and to block liquid flow from said third reservoir means through said external outlet means;
and control means including heating means which is positioned within said third reservoir means to heat said liquid in said third reservoir means when energized, and which is energized when said valve means is moved into said first position;
said valve means positionable in a second position to close the liquid flow path from said second reservoir means to said third reservoir means and to open said liquid flow path from said third reservoir means through said external outlet means.
2. Hot beverage dispensing means in accordance with claim 1 comprising;
adjustable tube-like open at both ends for determining the capacity of said third reservoir means and extending from within said third reservoir means upward to a level above and outside said third reservoir means;
sealing means between said adjustable means to provide a substantially airtight seal therebetween and to provide for vertical movement of said tubelike means therethrough.
3. Hot beverage dispensing means in accordance with claim 1 in which;
said valve means is responsive to said control means to assume said first position;
said control means is constructed to energize said heating means to heat the liquid in said third reservoir means to a desired predetermined temperature;
said control means being further constructed to respond to said desired temperature of said liquid in said third reservoir means to move said valve means into said second position, to deenergize said heating means, and to open said external outlet means to cause the heated liquid to flow out of said external outlet means.
4. Hot beverage dispensing means in accordance with claim 3 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

5. Hot beverage dispensing means in accordance with claim 1 comprising;

manually operable means for moving said valve into said first position; thermally responsive means for mechanically holding said valve means in said first position;

said control means responsive to the positioning of said valve means in said first position to energize said heating means to heat said liquid in said third reservoir means to a desired temperature;

said thermally responsive holding means constructed to respond to said desired temperature of the liquid in said third reservoir means to disengage from said valve means;

and means for returning said valve means to said second position to open said external outlet means to cause the heated liquid to flow through said external outlet means.

6. Hot beverage dispensing means in accordance with claim 5 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

7. Hot beverage dispensing means in accordance with claim 1 comprising;

means for manually moving said valve means to said first position;

two state electromagnetic means constructed when in its first state to hold said valve means in said first position and when in its second state to release said valve means from its first position;

means responsive to the moving of valve means to said first position to cause said electromagnetic means to assume its first state;

said heating means constructed to respond to said control means when said valve means is moved to its first position to become energized to heat the liquid in said third reservoir means;

and thermally responsive means responsive to the heating of said liquid in said third reservoir means to a predetermined temperature to energize said electromagnetic means to a predetermined temperature to energize said electromagnetic means to cause it to assume its second state and thereby release said valve means to its second position;

said control means responsive to the return of said valve means to its second position to deenergize said heating means and said electromagnetic means.

8. Hot beverage dispensing means in accordance with claim 7 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

9. Hot beverage dispensing means in accordance with claim 1 in which said control means further comprises solenoid means constructed, when energized, to move said valve means to said first position;

power supply means;

manually operable switching means to connect said power supply means to said solenoid means to energize said solenoid means;

second switching means responsive to the first position of said valve means to supply said power supply means to said heating means;

indicating means constructed, when energized, to be observable to the human senses;

and thermally responsive means responsive to a predetermined temperature of the heated liquid in said third reservoir means to energize said indicating means;

10. Hot beverage dispensing means in accordance with claim 9 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

11. Hot beverage dispensing means comprising;

first, second and third reservoir means positioned one below the other in the order named;

said first reservoir means being airtight and watertight and having a single outlet therein positioned near the bottom thereof within said second reservoir means and completely below the maximum water level capability of said second means;

external outlet means connecting, when open, said third reservoir means to the external side of said dispensing means;

and valve means constructed to have a first position to open a liquid flow path from said second reservoir means to said third reservoir means and to close said external outlet means;

said valve means constructed to have a second position to close said liquid flow path from said second reservoir means to said third reservoir means and to open said external outlet means;

heating means for heating the liquid in said third reservoir, and control means responsive to said valve being in its first position only for energizing said heating means.

12. Hot beverage dispensing means in accordance with claim 11 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

13. Hot beverage dispensing means in accordance with claim 6 in which;

said valve means is responsive to said control means to assume said first position;

said control means is constructed to energize said heating means to heat the liquid in said third reservoir to a desired predetermined temperature;

said control means being further constructed to respond to said desired temperature of said liquid in said third reservoir means to move said valve means into said second position, to deenergize said heating means, and to open said external outlet means to cause the heated liquid to flow out of said external outlet means.

14. Hot beverage dispensing means in accordance with claim 13 comprising;

adjustable tube-like open at both ends for determining the capacity of said third reservoir means and extending from within said third reservoir means upward to a level above and outside said third reservoir means;

sealing means between said adjustable tubelike means and said third reservoir means to provide a substantially airtight seal therebetween and to provide for vertical movement of said tubelike means therethrough.

15. Hot beverage dispensing means in accordance with claim 6 comprising;
manually operable means for moving said valve means into said first position;
thermally responsive means for mechanically holding said valve means in said first position;
said control means responsive to the positioning of said valve means in said first position to energize said heating means to heat said liquid in said third reservoir means to a desired temperature;
said thermally responsive holding means constructed to respond to said desired temperature of the liquid in said third reservoir means to disengage from said valve means;
and means for returning said valve means to said second position to open said external outlet means to cause the heated liquid to flow through said external outlet means.

16. Hot beverage dispensing means in accordance with claim 15 comprising;
adjustable tube-like open at both ends for determining the capacity of said third reservoir means and extending from within said third reservoir means upward to a level above and outside said third reservoir means;
sealing means between said adjustable tubelike means and said third reservoir means to provide a substantially airtight seal therebetween and to provide for vertical movement of said tubelike means therethrough.

17. Hot beverage dispensing means in accordance with claim 5 comprising;
means for manually moving said valve means to said first position;
two state electromagnetic means constructed when in its first state, to hold said valve means in said first position, and when in its second state, to release said valve means from its first position;
means responsive to the moving of valve means to said first position to cause said electromagnetic means to move to its first state;
said heater means constructed to respond to said control means when said valve means is moved to its first position to become energized to heat the liquid in said third reservoir means;
and thermally responsive means responsive to the heating of said liquid in said third reservoir to a predetermined temperature to cause energization of said electromagnetic means to its second state to cause said valve means to return to its second position;
said control means responsive to the return of said valve means to its second position to deenergize said heating means and said electromagnetic means.

18. Hot beverage dispensing means in accordance with claim 17 comprising;
adjustable tube-like open at both ends for determining the capacity of said third reservoir means and extending from within said third reservoir means upward to a level above and outside said third reservoir means;
sealing means between said adjustable tubelike means and said third reservoir means to provide a substantially airtight seal therebetween and to provide for vertical movement of said tubelike means therethrough.